UNITED STATES PATENT OFFICE.

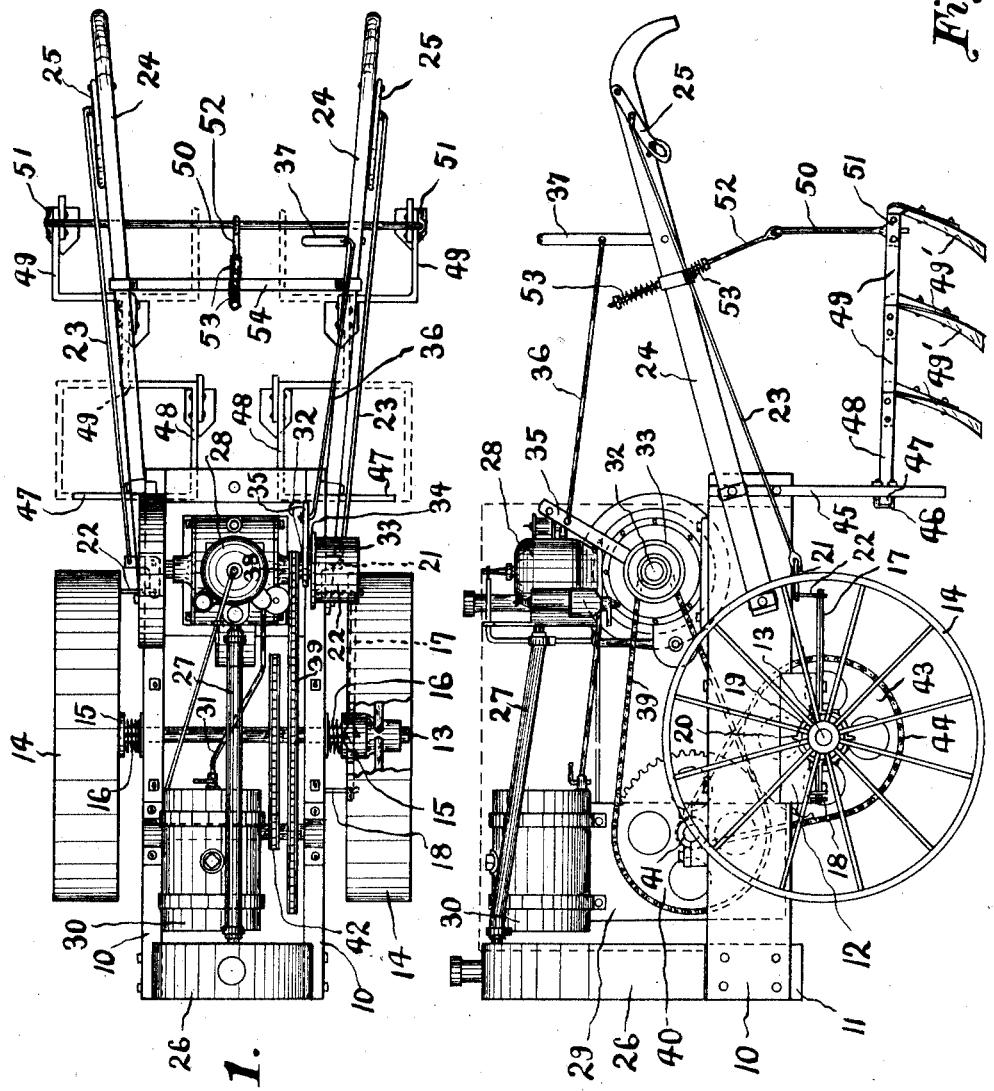

CHARLES F. SHOWALTER, OF OMAHA, NEBRASKA.

CULTIVATOR ATTACHMENT.

1,385,193.  Specification of Letters Patent.  Patented July 19, 1921.

Application filed June 18, 1920. Serial No. 389,854.

*To all whom it may concern:*

Be it known that I, CHARLES F. SHOWALTER, a citizen of the United States, residing at Omaha, in the county of Douglas and State of Nebraska, have invented certain new and useful Improvements in Cultivator Attachments, of which the following is a specification.

The present invention relates to cultivators and more particularly to those of the walking type adapted to be guided and operated by an attendant walking in the rear of the cultivator.

An object of the present invention is to provide a relatively light, simple constructed and operated implement adapted for use in truck gardens and the like, and to which a variety of tools or devices may be readily attached for the various purposes required, such as for cutting grass, plowing, cultivating and the like.

Another object of the invention is to provide a wheeled frame of this character with an improved cultivator bar for supporting a number of cultivator teeth in laterally and rearwardly stepped relation, so that when a pair of cultivator bars are used the same may be readily adjusted to place the cultivator teeth in outwardly or inwardly stepped relation according to the work to be done.

A further object of the invention is to provide a cultivator bar of the above-mentioned type with means for supporting the bar on the frame in position for adjustment transversely of the tractor, so that the cultivator teeth carried by a pair of bars may be spaced apart to the desired extent when the cultivator bars are so mounted on the frame as to diverge or converge rearwardly.

With these and further objects in view as will in part hereinafter become apparent and in part be stated, the invention comprises certain novel constructions, combinations and arrangements of parts as subsequently specified and claimed.

In the accompanying drawings,—

Figure 1 is a top plan view of a tractor with the cover removed constructed according to the present invention and equipped with the cultivator attachment.

Fig. 2 is a side elevation of the same.

Referring to the drawings by numerals, 10 designates a pair of side bars joined at opposite ends by cross pieces 11 forming with the side bars a main frame. Bearing brackets 12 are secured across the under side of the main frame and have bearings for supporting a transverse axle 13 upon which are mounted a pair of traction wheels 14. Each traction wheel 14 is loose upon the shaft 13 and is normally locked for turning therewith by a clutch element 15, which is toothed and which coöperates with teeth on the hub of the adjacent wheel 14. The clutch element 15 is urged against the wheel 14 by a spring 16 surrounding the adjacent portion of the shaft and normally tending to expand. A shifting lever 17 is pivoted upon an outstanding arm 18 at each side of the frame and is provided with an expanded or enlarged portion 19 fitting over the clutch element 15 and pivoted thereto by pins 20 permitting the swinging of the lever 17 and the retracting of the clutch element 15 against the tension of spring 16. A bell crank lever 21 is pivoted to each side and upon the rear end portion of the frame and has connection through link 22 with the rear end of the adjacent lever 17 for releasing the clutch when the bell crank lever is swung rearwardly at its free end. A connecting rod 23 is pivoted to the free end of the bell crank lever 21 and projects rearwardly from the frame at the adjacent side thereof, and the connecting rods 23 are supported upon a pair of rearwardly and upwardly extending handle bars 24 bolted or otherwise rigidly secured against the opposite sides of the frame. Each handle bar 24 has pivoted thereto a downwardly-extending shifting lever 25, connected intermediately to the adjacent rod 23 and having a handle portion upon its lower end adapted to be grasped by the hand for swinging the lever 25 rearwardly. This rearward movement of the lever 25 is adapted to shift the adjacent clutch 15 and free the adjacent traction wheel 14 from the shaft or axle 13.

The forward end of the frame is provided with a radiator 26, of any approved type, adapted for cooling the water employed in the cooling system of an internal combustion engine. The radiator is connected by a hose 27 with the water jacket of an internal combustion engine 28, which is mounted preferably upon the rear end of the main frame. In rear of the radiator is disposed an upright support 29, which may be in the form of a box or the like for carrying tools or implements, and upon the support 29 is mounted a fuel tank 30, which is connected by a pipe 31 with the carbureter of the engine 28 to supply fuel thereto.

The engine has a crank shaft 32 upon which is freely mounted a pulley 33, adapted to be connected to the shaft 32 by a clutch 34 under control of an upstanding arm 35. The arm 35 carries one end of a connecting rod 36 which is pivoted at its other end to the intermediate portion of a hand lever 37. The hand lever 37 is pivoted at its lower end to the adjacent handle bar 24, and is in position for easy access by the attendant for coupling and uncoupling the pulley 33 from the engine.

The shaft 32 of the motor is provided with a sprocket wheel 38 over which is trained a roller shaft 39, which also passes over a relative large sprocket wheel 40 mounted upon a counter-shaft 41, which has bearing across the upper edges of the side bars 10, preferably beneath the fuel tank 30. The shaft 41 and the axle 13 are provided with sprocket wheels 42 and 43 over which passes a chain 44 for establishing a connection between the countershaft and the axle, so that when the countershaft is driven at a reduced rate of speed from that at which the engine is operated, the axle may be driven at a still greater reduced rate of speed.

The tractor thus constructed is adapted to carry and operate different types of devices used about a truck garden or small farm, and when equipped with a cultivator, as shown in Figs. 1 and 2, is provided on its handle bars 24 with a pair of depending standards or rods 45, which are secured by U-clamps 46 to the handle bars 24 near the forward ends of the latter. The supports or rods 45 carry upon their lower end portions adjustable clamping sockets 46, adapted to receive therein transversely extending shanks 47 of cultivator bars 48.

Each cultivator bar 48 is provided with a plurality of portions 49 which are consecutively offset from the bar 48 in the same direction, and when a pair of bars 48 is mounted on the tractor in the position shown in full lines in Fig. 1, the rear ends of the bars diverge and in such relation may be adjusted toward and from each other by sliding the shanks 47 through the sockets 46, and the sockets may be clamped against the shanks 47 to secure the cultivator bars 48 in the adjusted position. As also shown in Fig. 1, in dotted lines, the cultivator bars 48 may be removed from the sockets 46 and turned over or reversed to bring the rear ends of the cultivator bars into convergent relation. The cultivator bars may thus be adjusted toward or from each other in this rearwardly converging relation. The advantages obtained by such a structure of cultivator bar are an accurate and fine adjustment of the teeth 49 toward and from each other, and also in outwardly or inwardly stepped relation with respect to the central longitudinal axis of the tractor. The rear ends of the cultivator bars 48 are supported upon bails 50, which are arched upwardly from the cultivator bars and have their lower ends secured by clamps 51 to the cultivator bars. Hinged, or otherwise suitably mounted upon the bail 50, is a connecting rod 52, equipped with a pair of springs 53 adapted to engage against the opposite sides of a cross brace 54 carried by the handles 24, the springs 53 being thus arranged one above and the other below the cross bar 54 to normally and yieldingly retain the cultivator bars in a predetermined position beneath the rear ends of the tractor.

It is, of course, understood that various changes and modifications may be made in the details of construction and design of the above specifically described embodiment, including changes in size, proportion and selection of materials, without departing from the spirit of this invention, such changes and modifications being restricted only by the scope of the following claims.

What is claimed is:—

1. In a tractor, a wheeled frame, depending supports carried upon the rear end of the frame, a pair of sockets mounted on the lower ends of the supports, cultivator bars secured at their forward ends to the sockets and having depending cultivator teeth, a pair of rearwardly extending handles mounted on the frame, a cross piece supported upon the handles, a yieldably supported link carried by the cross piece, and a bail mounted on the lower end of the link and having connection with the rear ends of the cultivator bars.

2. In combination with a wheeled frame of the walking type provided with a pair of rearwardly extending handles, depending supports mounted upon the rear end of the frame, a pair of cultivator bars adjustably connected at their forward ends to the supports and having depending cultivator teeth, a bail connecting together the rear ends of the cultivator bars, and a yieldable supporting connection between the bail and said handles for supporting the rear ends of the cultivator bars.

In testimony whereof, I have affixed my signature in presence of two witnesses.

CHARLES F. SHOWALTER.

Witnesses:
   ARTHUR H. STURGES,
   HIRAM A. STURGES.